April 30, 1963 S. CIRAOLO 3,087,522
APRICOT ORIENTATOR AND CUTTER
Filed Feb. 11, 1955 5 Sheets-Sheet 1

INVENTOR.
SAMUEL CIRAOLO
BY George B. White
ATTY

April 30, 1963
S. CIRAOLO
3,087,522
APRICOT ORIENTATOR AND CUTTER
Filed Feb. 11, 1955
5 Sheets-Sheet 2
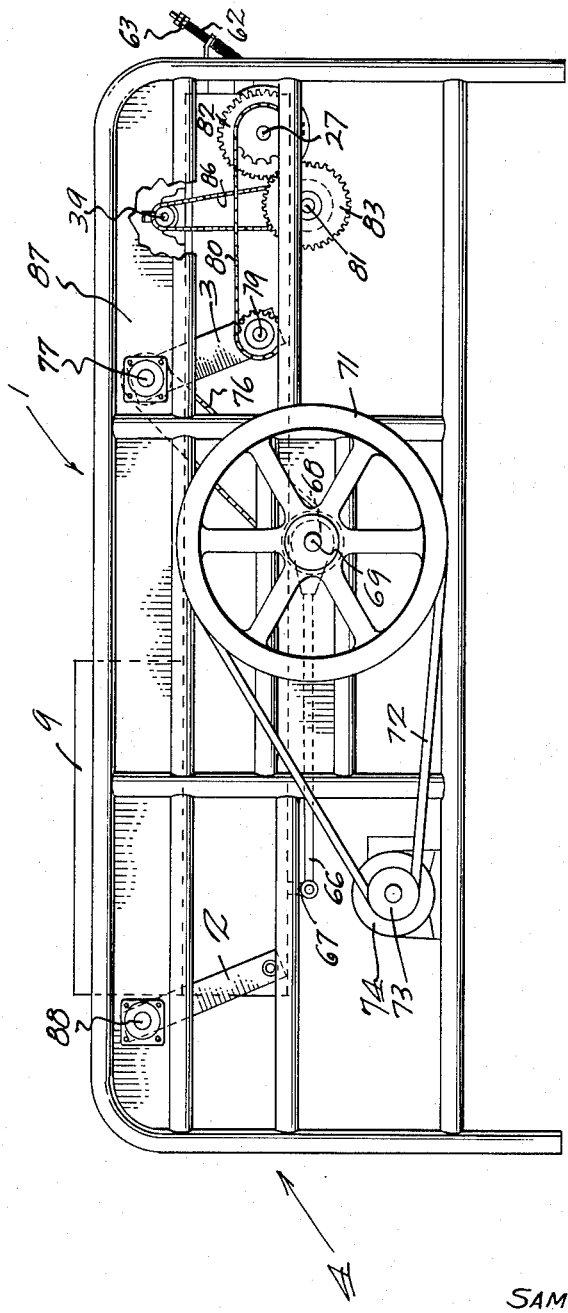
_Fig - 2_
INVENTOR.
SAMUEL CIRAOLO
BY George B White
ATTY April 30, 1963 S. CIRAOLO 3,087,522
APRICOT ORIENTATOR AND CUTTER
Filed Feb. 11, 1955 5 Sheets-Sheet 3

INVENTOR.
SAMUEL CIRAOLO
BY George B White
ATTY

April 30, 1963 S. CIRAOLO 3,087,522
APRICOT ORIENTATOR AND CUTTER
Filed Feb. 11, 1955 5 Sheets-Sheet 4
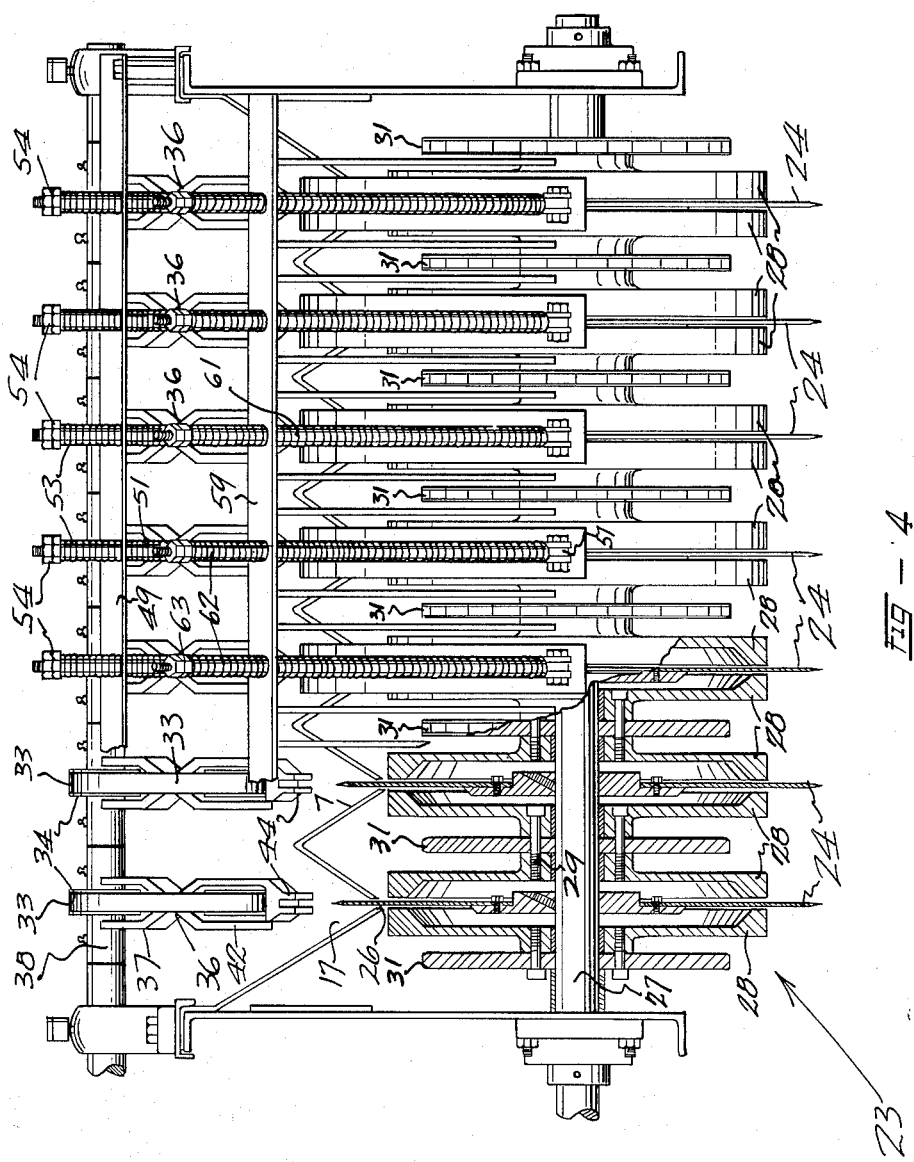
INVENTOR.
SAMUEL CIRAOLO
BY George B White
ATTY April 30, 1963
S. CIRAOLO
3,087,522
APRICOT ORIENTATOR AND CUTTER
Filed Feb. 11, 1955
5 Sheets-Sheet 5
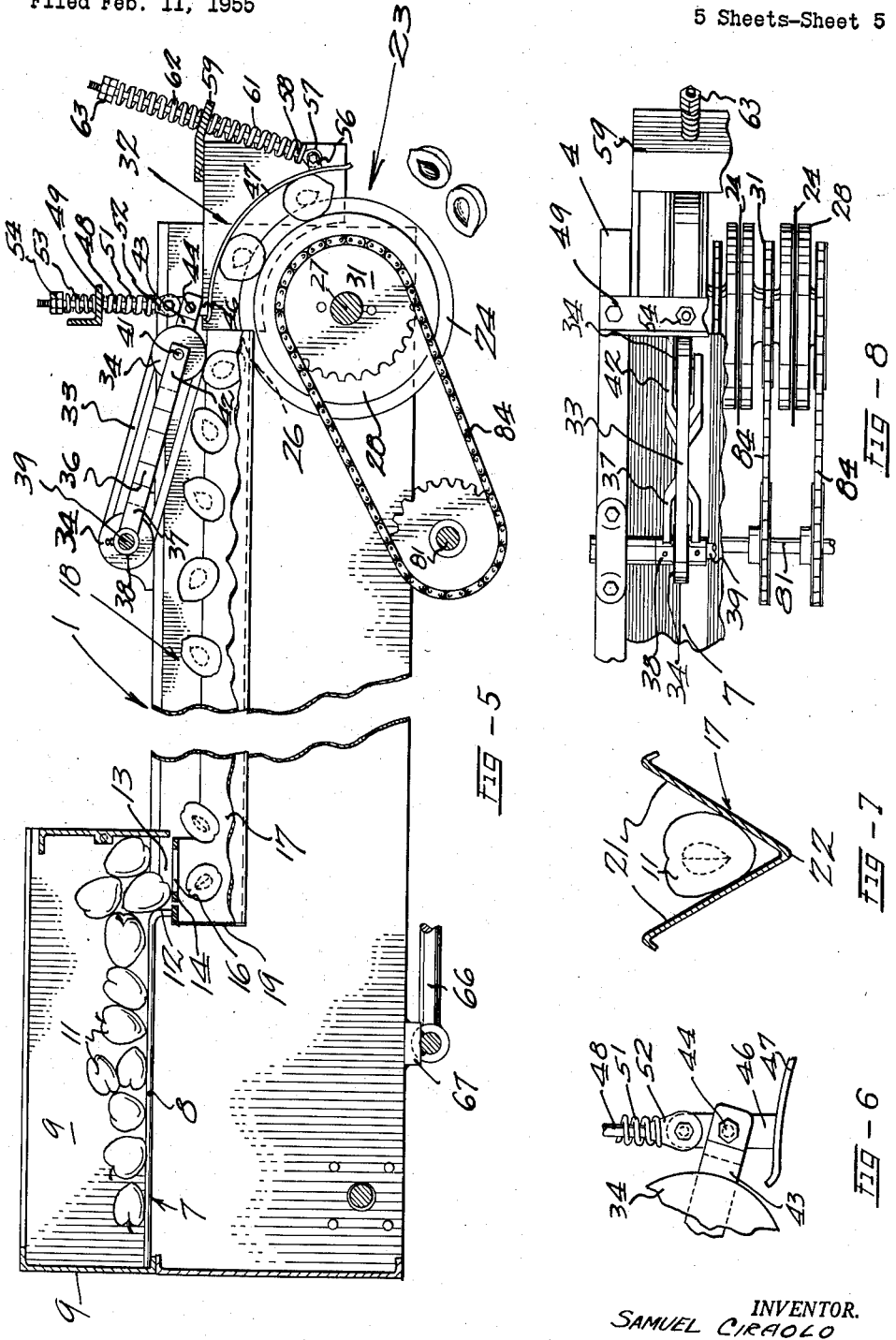
INVENTOR.
SAMUEL CIRAOLO
BY George B. White
ATTY

3,087,522
APRICOT ORIENTATOR AND CUTTER
Samuel Ciraolo, 1335 Fiori Ave., Modesto, Calif.
Filed Feb. 11, 1955, Ser. No. 487,565
17 Claims. (Cl. 146—73)

This invention relates to an apricot cutter machine.

The primary object of this invention is to provide a fully automatic machine in which the apricots are aligned in a row so that the apricots are moving in the direction of their advance so as to stand with the longitudinal or major axis of each apricot between the stem and the blossom ends of the apricot being upright perpendicular and generally parallel with the line of advance; or in other words, the edges of the major plane of the pit are generally parallel with the line of advance of the apricot on the machine with the axis through the points of the pit vertical; and to provide a suitable cutting device to efficiently and quickly cut the apricot in one half along said longitudinal major axis or plane.

Another object of the invention is to provide an apricot cutter device of the character described in which a plurality of suitably shaped chutes or channels receive the apricot and are oscillated in such a manner that the apricot is thrown upward and forward by its moment of inertia and at the same time by reason of the angular relation of the walls of such channel the apricots are carried in a position in which their longitudinal or major axis between the stem and the blossom ends of the apricot of the plane, passing through the joining lines or edges of the pit of the apricot, are in line with the direction of movement of the apricot and the major axis of the apricot between said stem and the blossom ends is generally perpendicular to the bottom of said channel; means being provided to engage said apricot while still in such channel and move and rotate the apricot over suitable cutting elements or blades for cutting the apricot in half along said plane running through said major axis.

Another object of the invention is to provide a combination of feeding channels on an oscillating table for advancing the apricots in a position where the main axis of the apricot is perpendicular to the plane of the table and the edges of the pit are in a plane generally parallel with the direction of advance of the apricots in said channels on said table and to engage said apricots near the end of their path in said channels and carry each apricot around a suitable blade, and simultaneously rotate the apricot so as to assure the cutting of the apricot on said perpendicular plane all around the apricot and to the pit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

Wtih the foregoing and other objects in view, which will be made manifest in the following detailed description, reference is had to the accompanying drawings for the illustrative embodiment of the invention, wherein:

FIG. 2 is a side view of my apricot cutter device.

FIG. 4 is an enlarged fragmental end view of the device partly in section showing the relation of the cutting mechanism to the advancing chutes.

FIG. 5 is an enlarged fragmental longitudinal sectional view of the device showing the part of advance of the apricot in one of the chutes or channels.

FIG. 6 is an enlarged fragmental view showing the apricot guiding or holding means at the cutting end of the machine.

FIG. 7 is an enlarged cross sectional view of one of the chutes or channels with the apricot therein, and FIG. 8 is an enlarged fragmental plane view of the end of the machine to show the relative location of the conveyor for engaging the apricot near the end of the chutes and said apricot guide.

Figure 1:
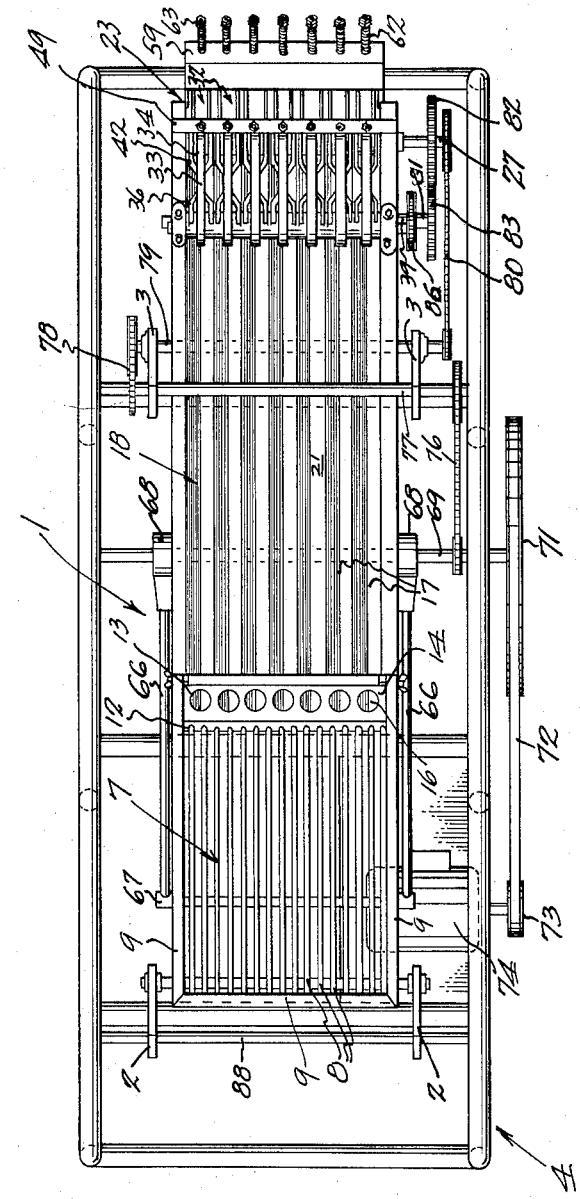
FIG. 1 is a plane view of my cutter device.
Figure 3:
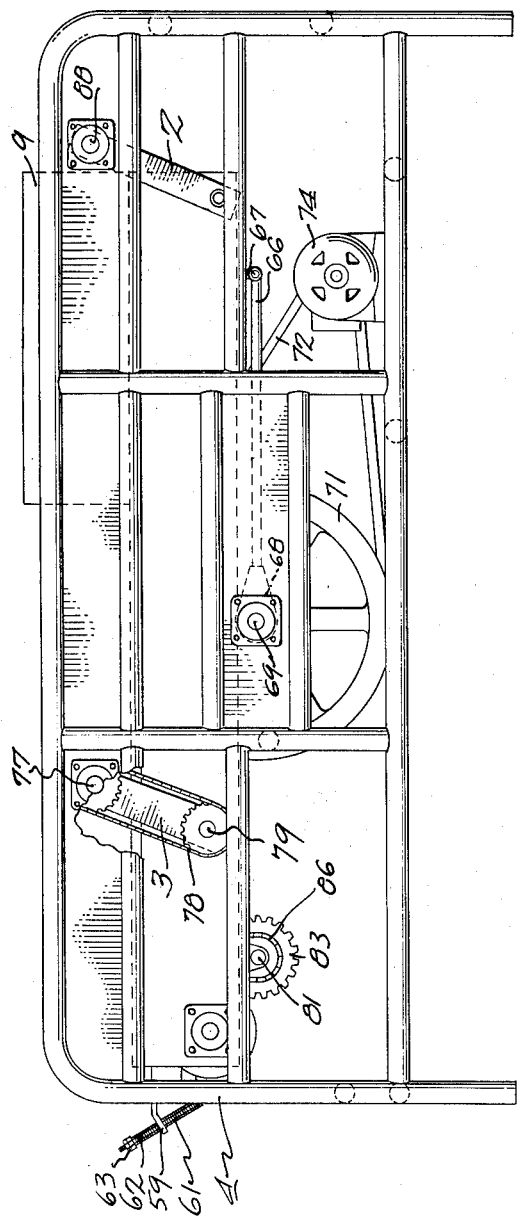
FIG. 3 is a side view from the side opposite to the side view shown in FIG. 2.

In carrying out my invention I make use of an oscillatable table 1 which is suspended on pitman arms 2 at the opposite sides of its inlet end and a pair of pitman arms 3 spaced from its outlet end on a suitable frame or support 4.

The rocking table 1 has an intake end which has an intake platform 7 formed of parallel bars 8 arranged longitudinally of the table. Around the intake platform 7 are perpendicular walls 9 surrounding three sides thereof so as to prevent the apricot 11 from rolling off the platform 7. At the end of the platform 7 toward the outlet of the machine the bars 8 have a downwardly curved end 12 so as to form a well 13 into which the apricots 11 can drop. The bottom of the well 13 is formed by a perforated plate 14 the holes 16 of which are adapted to permit the apricot to drop through downwardly and into the respective chutes or channels 17 thereunder.

The middle portion of the table 1 is formed by a chute section 18 including a plurality of parallel chutes 17. Each chute 17 extends from under one of the holes 16 of the bottom 14 as heretofore described. The end of each chute 17 under the platform 7 is closed by an end wall 19. Each chute or channel 17 is generally of of V-shaped cross-section. In connection with average apricots it was found that an included angle of 60° between the sides 21 of the chute 17 is the most efficient. This is arranged symmetrically with respect to the perpendicular. In other words, each side 21 of the chute 17 cross-sectionally is inclined to the perpendicular plane or line running through the bottom apex or point 22 of the chute at an included angle of about 30°. The chutes 17 are generally parallel and generally horizontal.

At the discharge end of the chutes 17 under the discharge end of the table is the cutting mechanism 23. This cutting mechanism includes a series of rotating blades 24, each of which projects through a slot 26 at the apex line of the adjacent chute 17 near the outlet end of said chutes 17. In the present form the blades are mounted on a single cross-shaft 27 so as to rotate with the shaft 27 when the latter is rotated in any suitable manner hereinafter to be described.

Each blade 24 is confined between a pair of complemental drum sections 28. Each drum section 28 is a circular or cylindrical drum which extends to a circumference spaced from the outer periphery of the respective blades 24 particularly shown in FIG. 4. The adjacent drum sections 28 between adjacent blades 24 are bolted together by suitable bolts 29. The bolts 29 also secure to the respective drum sections 28 suitable sprockets 31 through which rotation is imparted to the drums section 28 at selected speed, in a manner to be hereinafter described.

A guiding device 32 above the discharge of each chute 17 and above the adjacent blade 24 and drum sections 28 guides the apricots in such a manner that the apricots are turned as they are carried around the drum so that the blade 24 cuts the apricot neatly all around its circumference quickly and efficiently. Above the outlet portion of each chute 17 is provided a suitable belt 33, preferably a so called "V-belt," which is extended over a pair of pulleys 34. The respective pulleys are journalled on the opposite ends of a double yoke lever 36. The upper yoke 37 of the lever 36 is formed into journal bushings 38 around a drive shaft 39 so that the lever 36 freely pivots on its fulcrum on the drive shaft 39. The upper or drive pulley 34 is drivingly connected to the shaft 39 between the journal bushings 38 so that it is driven by the shaft 39.

The lower or driven pulley 34 is journalled on a shaft 41 in the lower yoke 42 of the lever 36. One leg of the lower yoke 42 has an extension 43 thereon for connection to a pivot 44 extended through a lug 46. The lug 46 extends from the top of an arcurate shield or shield guide 47, which extends generally concentrically from above the top of the blades and drum sections to about 90° outside of the blade. The distance between the guide shield 47 and the drum sections 28 is such that the shield bears against the apricot periphery with sufficient pressure so that the apricots are rotated by the drum sections 28 as they are pressed down under the guide shield 47, and thus are cut by the blade 24 all around the apricot periphery.

The top of the lug 46 of the guide shield 47 is fulcrumed in the lower end of a rod 48, which rod 48 extends through a hole in an angle bar 49 as shown in FIG. 5 and in FIG. 8. A coil spring 51 bears against the underside of the angle bar 49 and the yoke 52 at the fulcrum end of the rod 48 so as to urge the rod 48 normally downwardly toward the drum sections 28. A balancing coil spring 53 bears against the top of the horizontal flange of the angle bar 49 and against bearing nuts 54 near the top of the rod 48 so as to adjustably counterbalance the downward urge of the spring 48 and thereby regulate the pressure exerted upon the apricots at the upper end of the guide shield. Near the lower end of the guide shield 47 extends an ear 56 in which is fulcrumed the fulcrum boss 57 on the lower end of another rod 58. This rod 58 extends through a hole in a fixed plate 59 slidably. The fixed plate 59 extends across the rear end of the machine and is fixed on the frame of the machine and is bent at such an angle as to allow the rod 58 to reciprocate at a suitable angle as shown in FIG. 5 to exert the necessary pressure upon the lower end of the guide shield 47. A coil spring 61 bears against the underside of the plate 59 and the fulcrum boss 57 to normally urge the rod 58 and the shield toward the drum sections 28 and against the apricots thereunder. Another coil spring 62 bears against the upper side of the blade 59 and against the adjusting nuts 63 for the balancing action and the springs can be adjusted so as to deterimne the pressure exerted by the guide shield upon the apricots toward the discharge end.

By reason of the connection of the yoke lever 36 to the guide shield the pressure by the belt 33 as well as by the guide shield 47 can be adjusted so as to assure the turning of each apricot at least 360° degrees during its fast travel under the guide shield so as to assure the complete circular cutting of each apricot by the underlying blade. As the apricots approach the end of the chute 17 the underside of the belt 33 engages them. It is to be noted that the pulleys 34 are rotated in a counter-clockwise direction viewing FIG. 5 so that the branch of the belt 33 adjacent the apricots travels toward the blade 24 and toward drum sections 28 and toward the upper or intake end of the guide shield 47 and thus accelerates the travel of each individual apricot to engagement with the blade 24 and drum sections 28. This acceleration of each individual apricot at this area also results in separation of the apricots at the blade end of each chute and positively prevents bunching of apricots at the blades. According to the size of the apricot, the V belt and guide shield can be raised or lowered according to the balance of the before described coil springs 51 and 53. As soon as the apricot engages the blade and the drum sections 28 it is rotated by reason of the frictional engagement of the apricot with the underside of the guide shield 47 according to the adjusted pressure of the previously described coil springs and as so rotated the blade cuts the apricot all around so that the apricot falls out in halves and it can be easily pitted and canned or otherwise treated.

For the purpose of efficient operation according to the size and kind of product, the speed of rotation of the drum sections 28 and of the blade 24 may be the same or in some cases it may be different. It was found advantageous in connection with the present machine and average size apricots to rotate the blades 24 about three times faster than the rotation of the drum sections 28.

It is to be noted especially as shown in FIG. 2, that the upper end of each pitman arm 2 and 3 is journaled on the frame 4 and that each pitman arm 2 and 3 on each side extends downwardly and forwardly with respect to the direction of the feeding or advancing of the appricots in the machine. Hence as the table is rocked back and forth, it not only has a horizontal component of motion, but also a vertical component, namely, a forward and upward and rearward and downward motion on the respective strokes of oscillation. This throws the apricots up and forward and turns them, and thereby loosens the apricots from bunching and from the narrow bottom of the chutes. As the apricots are thrown up they turn around by their moment of inertia and assume the position shown in FIG. 7, namely the apricot follows the contour of the chute so that the apricot stands with its major axis or plane through the stem and blossom ends vertical and parallel with the longitudinal center plane of the chute.

The reciprocation or rocking of the table is accomplished by connecting rods 66, each connected at one end to a suitable ear 67 on the bottom of the table and connected at the other end in the usual manner to an eccentric drive 68 on a shaft 69, as shown in FIG. 1. There is such a connecting rod 66 on each side of the frame, on respective ears 67, which are formed on the ends of a fixed cross member extending across the underside of the table. A shaft 69 extends across and underneath the table 1 and is suitably journaled on the frame 4 so as to hold the eccentric drive 68 adjacent to each side of the table.

Rotation is imparted to the shaft 69 through a drive wheel 71 which is driven by a suitable belt 72 from the drive pulley 73 of an electric motor 74.

The various other moving and driving devices of the machine are also driven from the same shaft 69. A sprocket and chain transmission 76 extends from the shaft 69 upwardly and forwardly of the machine to a transmission rotating an upper cross shaft 77. The forward pitman arms 3 are journaled on the upper cross shaft 77 so as to float on the same. The ends of the upper cross shaft 77 are suitably journaled on the frame 4. On the opposite end of the upper cross shaft 77 is another sprocket and chain transmission 78 which extends downwardly and forwardly to drive a lower cross shaft 79, which latter is journalled in the lower end of the respective pitman arms 3. This lower cross shaft 79 is also journaled in suitable journals on the lower portion of the table.

A third sprocket and chain transmission 80 extends generally horizontally and forwardly of the machine to a transmission rotating the blade shaft 27 at the desired ratio. On the same blade shaft 27 is a gear 82 which drives another gear 83 on a shaft 81 journaled in the underside of the table for driving through suitable sprocket and chain transmissions 84 the respective sprockets 31 on the drum sections 29 as heretofore described. This drive extends beneath the chutes and the other mechanisms on the table.

From the shaft 81 extends upwardly a sprocket and chain transmission 86 which drives the shaft 39 for driving the upper belt 33 of the guide mechanism.

The frames 4 may be of any suitable construction. In the present illustration a longitudinal top plate 87 is provided on each side to accommodate and hold the end bearings for the top shaft 77 and also to hold the cross bar 88 on which the pitman arms 2 are hung or suspended.

This machine is particularly efficient in connection with apricots or large fruits of generally oval cross-section, such as the so called Tilton apricots because apricots or fruits of such oval or egg shape have such division of their mass as to assume the position coacting with the V-shaped chutes for advancing with their major axis or plane generally in registry with the blade. Thus the blade cuts efficiently along the edges of the pit.

In operation the apricots are dumped at the intake end of the table onto the platforms 7 and as the table 1 is rocked on its pitman arms, as heretofore described, the apricots 11 are advanced by inertia toward and into the well 13 and then dropped through the respective holes 16 one by one into the respective V-shaped chutes 17. Due to the oscillation of the table 1, as heretofore described, the apricots 11 are individually thrown up and toward the outlet end of the chutes 17 and as so thrown the apricots coact with the inclined sides 21 of the respective chutes 17 so that the generally oval or egg shaped apricots assume an upright position in the chutes 17 with the narrower point of each apricot toward the chute bottom or apex 22. As the apricots are thus swung and turned, they also assume a position wherein the joining edges of the apricot pit face in the direction of advance or parallel with the longitudinal center plane of the chutes 17. Thus the apricots are advanced and ultimately assume the position shown in FIG. 7 where the apricot is generally upright or perpendicular to the bottom or apex 22 of the inclined chute 17 with the stem end of the apricot at the top and the blossom end near the bottom, and the seam or the joining edges of the pit of the apricot are in a plane parallel with the line of advance or longitudinal center plane of the chute 17.

As the apricots in said position reach the outlet end of the respective chutes 17, each apricot is individually engaged by the belt 33 which accelerates the movement of the adjacent apricot so as to separate it from the succeeding apricots and thereby prevent bunching. This also guides the apricot in said position to the cutting blade 24 and by reason of the resiliently adjusted guide 47 the apricot is pressed against the blade 24 and against the periphery of the adjacent drums 28 so that the drums spin or rotate apricots around in said predetermined plane and thus the apricots are cut by the blades along the major axis or plane thereof, as heretofore described, and are dropped out from under the guide 47 in neatly cut halves which can be easily pitted and canned or otherwise treated.

The device is comparatively simple in construction and operation; it does not require skilled labor for setting up; and it can be readily operated by average labor ordinarily available; it provides for increased efficiency and speed and also uniformity of cutting of apricots.

I claim:

1. In a cutter device for apricots and the like, a frame, a table rockably suspended on said frame, a channel of generally V-shaped cross-section being formed longitudinally on the table, means at one end of the channel to feed the apricots into the V-shaped channel, means at the other end of the channel rockably supported with said table for guiding and cutting the apricots, and means to rock said table and said guiding and cutting means generally longitudinally with respect to said channel so as to throw apricots in said channel upward and toward said cutting means, and so that said apricots assume an upright position with the stem end of the apricot being at the top and the major plane of said apricots and its pit being generally parallel with the longitudinal center plane of said V-shaped channel.

2. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots in said channel travel, and means to support said cutting device rockably with said channel, said cutting device including a cutting blade aligned longitudinally with the outlet end of the channel, yieldable means to hold the apricot against said blade at said end of the channel, and means to carry the apricot along the blade and to simultaneously turn the apricot about its axis so as to bring the entire circumference of the apricot in contact with said blade.

3. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots in said channel travel and means to support said cutting device rockably together with said channel, said cutting device including a cutting blade aligned longitudinally with and projecting partly into the outlet end of the channel so as to penetrate to about the pit of each apricot, yieldable means to hold the apricot against said blade at said end of the channel, means adjacent said outlet end of said channel to engage each individual apricot and to accelerate its motion by rotating the apricot toward said cutting blade, and means to carry the apricot along the blade and to simultaneously turn the apricot about its axis so as to bring the entire circumference of the apricot in contact with said blade.

4. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots in said channel travel and means to support said cutting device rockably together with said channel, said cutting device including a cutting blade aligned longitudinally with and projecting partly into the outlet end of the channel so as to penetrate to about the pit of each apricot, yieldable means to hold the apricot against said blade at said end of the channel, means adjacent said outlet end of said channel to engage each individual apricot and to accelerate its motion by rotating the apricot toward said cutting blade, and means to carry the apricot along the blade and to simultaneously turn the apricot about its axis so as to bring the entire circumference of the apricot in contact with said blade, and means to drive said accelerator and said blade and said carrying means at a predetermined relative ratio of speed of rotation.

5. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel, said cutting device including a rotating cutting blade in longitudinal alignment with and projecting partly into the longitudinal center line of the channel so as to penetrate to about the pit of each apricot, a yieldable guide extended from said channel outwardly and over a part of said blade to guide and hold the apricot against said blade, a rotating carrier rotating along said blade and engaging said apricot so as to turn the apricot and carry it relatively to said blade so that the apricot is turned completely around and cut by the blade around the apricot's entire circumference.

6. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel, said cutting device including a rotating cutting blade in longitudinal alignment with and projecting partly into the longitudinal center line of the channel so as to penetrate to about the pit of each apricot, a yieldable guide extended from said channel outwardly and over a part of said blade to guide and hold the apricot against said blade, a rotating carrier rotating along said blade and engaging said apricot so as to turn the apricot and carry it relatively to said blade so that the apricot is turned completely around and cut by the blade around the apricot's entire circumference, the said carrying means being rotated at a slower rate of speed than the said blade.

7. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots in said channel travel, said cutting device including a cutting blade aligned longitudinally with and projecting partly into the outlet end of the channel so as to penetrate to about the pit of each apricot, yieldable means to hold the apricot against said blade at said end of the channel, and means to carry the apricot along the blade and to simultaneously turn the apricot about its axis so as to bring the entire circumference of the apricot in contact with said blade, and means adjacent said outlet end of said channel to engage each individual apricot and to accelerate its motion by rotating the apricot toward said cutting blade, said apricot accelerating means including a belt above and generally longitudinally aligned with said channel, means to drive said endless belt in a direction so that its portion immediately above said channel moves toward said blade, and means to yieldably support said belt above said channel so that said belt engages and conforms to various sizes of apricots and accelerates and turns the apricots toward said blade individually so as to prevent bunching of said apricots.

8. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots in said channel travel, said cutting device including a cutting blade aligned longitudinally with and projecting partly into the outlet end of the channel so as to penetrate to about the pit of each apricot, yieldable means to hold the apricot against said blade at said end of the channel, means to carry the apricot along the blade and to simultaneously turn the apricot about its axis so as to bring the entire circumference of the apricot in contact with said blade, means adjacent said outlet end of said channel to engage each individual apricot and to accelerate its motion by rotating the apricot toward said cutting blade, said apricot accelerating means including a belt above and generally longitudinally aligned with said channel, means to drive said endless belt in a direction so that its portion immediately above said channel moves toward said blade, means to yieldably support said belt above said channel so that said belt engages and conforms to various sizes of apricots and accelerates and turns the apricots toward said blade individually so as to prevent bunching of said apricots, and means to connect said accelerator means to said yieldable means so as to simultaneously adjust both means to conform generally to the size of the apricot.

9. In a cutter device for apricots and the like a rockable table, a channel of generally V-shaped cross-section formed longitudinally on the table, means on the table at one end of the channel to feed the apricots into the V-shaped channel, means supported on the table at the other end of the channel for guiding and cutting the apricots, and means to rock said table longitudinally with respect to said channel so as to throw apricots in said channel upward and toward said cutting means, so that said apricots assume an upright position with the stem end of the apricot being at the top and the major plane of said apricots and its pit being generally parallel with the longitudinal center plane of said V-shaped channel, said rocking means including a frame, a plurality of pitman arms, an end of each pitman arm being fulcrumed on said frame and the other end of each arm being fulcrumed on said table so as to suspend the table on said frame, and eccentric drive means to rock said table on said pitman arms generally longitudinally with respect to said channel, said feeding means including a hopper element into which the apricots are introduced, a feeding recess extended transversely across said channels, said feeding recess having an outlet aperture opposite and above each channel to permit an apricot individually to pass through said aperture into said channel.

10. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel being rockable with said channel, said cutting device including a rotating cutting blade in longitudinal alignment with the longitudinal center line of the channel a yieldable guide extended from said channel outwardly and over a part of said blade to guide and hold the apricot against said blade, a rotating carrier rotating along said blade and engaging said apricot so as to turn the apricot and carry it relatively to said blade so that the apricot is turned completely around and cut by the blade around the apricot's entire circumference, said carrying means including drum elements adjacent the opposite faces of each blade, the peripheries of said drum elements being spaced from the periphery of said blade to a distance substantially equal to the average thickness of the meat of the apricots to be cut.

11. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel being rockable with said channel, said cutting device including a rotating cutting blade beneath and in longitudinal alignment with the longitudinal center line of the channel and projecting into the outlet end of the channel so as to penetrate to about the pit of the apricot, a yieldable guide extended from said channel beyond said outlet end and over a part of said blade to guide and hold the apricot against said blade, a rotating carrier rotating along said blade and engaging said apricot so as to turn the apricot and carry it relatively to said blade so that the apricot is turned completely around and cut by the blade around the apricot's entire circumference, said carrying means including drum elements adjacent the opposite faces of each blade, the peripheries of said drum elements being spaced from the periphery of said blade to a distance substantially equal to the average thickness of the meat of the apricots to be cut, and means to drive said blade and said drum elements at a predetermined ratio of relative speed for turning said apricot around as the apricot is carried along said rotating blade to be cut thereby.

12. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel being rockable with said channel, said cutting device including a rotating cutting blade beneath and in longitudinal alignment with the longitudinal center line of the channel and projecting into the outlet end of the channel so as to penetrate to about the pit of the apricot, a yieldable means extended from said channel beyond said outlet end and over a part of said blade to guide and hold the apricot against said blade, a rotating carrier rotating along said blade and engaging said apricot so as to turn the apricot and carry it relatively to said blade so that the apricot is turned completely around and cut by the blade around the apricot's entire circumference, and means to adjust the yieldability of said yieldable means.

13. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel being rockable with said channel, said cutting device including a rotating cutting blade, beneath and in longitudinal alignment with the longitudinal center line of the channel and projecting into the outlet end of the channel so as to penetrate to about the pit of the apricot, a yieldable means extended from said channel beyond said outlet end and over a part of said blade to guide and hold the apricot against said blade, a rotating carrier rotating along said blade and engaging said apricot so as to turn the apricot and carry it relatively to said blade so that the apricot is turned completely around and cut by the blade around the apricot's entire circumference, said yieldable means including a shield extended from said channel over and above about one-quarter of said blade so as to press the apricots toward said blade; a spring pressed support extended from each end of said shield, and means to adjust the spring tension of said spring pressed support.

14. In a cutter device for apricots and the like, a channel of generally V-shaped cross-section having an outlet end, means to rock said channel generally longitudinally and alternately upward and forward, and downward and backward with respect to the advancement of the apricot in said channel, a cutting device at the outlet end of the channel toward which the apricots travel in said channel being rockable with said channel, said cutting device including a cutting blade aligned longitudinally with the outlet end of the channel, yieldable means to hold the apricot against said blade at said end of the channel, means adjacent said outlet end of said channel to engage each individual apricot and to accelerate its motion by rotating the apricot toward said cutting blade, said yieldable means including a shield extended from said channel over and above about one-quarter of said blade so as to press the apricots toward said blade; a spring pressed support extended from each end of said shield, means to adjust the spring tension of said spring pressed support, means of connection between said accelerator means and said shield for raising said shield in accordance with the size of apricot accelerated by said accelerator.

15. In an apricot cutting device the combination with the cutting elements of the device, a V-shaped channel to advance the apricots in a single line toward said cutting elements, and means to rock said V-shaped channel alternately substantially upward and toward said direction of advance and substantially downward and away from said direction so as to repeatedly throw the apricots upwardly and toward said cutting elements in said channel, said cutting elements being rocked simultaneously with said channel so as to be in fixed alignment with said channel, said channel being cross-sectionally V-shaped, the sides thereof converging at an included angle generally between 45° to 60°, a resiliently yieldable guide at said cutting elements to receive and press each apricot toward said blade, and means coacting with said guide to rotate each apricot individually along said blades so that the apricot is cut by said blade about its entire periphery.

16. In a machine for cutting apricots and the like, a frame, a table, a generally V-shaped channel longitudinal on the table, said channel having an outlet end, a rotating cutter supported on the table at and partly below the outlet end of the channel but projecting into said channel, a yieldable guide extended from said outlet end over a portion of said cutter to urge each apricot onto the adjacent periphery of the cutter, means coacting with said guide and cutter to engage and turn said apricot while it is so pressed against said cutter periphery, suspending means to suspend said table on said frame so that said table is rockable longitudinally and on an arcuate path, and means to impart rocking movement to said table.

17. A device for orienting and halving fruit or vegetables comprising a generally V-shaped trough conveyor, means operatively associated with said trough for causing reciprocating thereof whereby the fruit or vegetables are oriented, and a single power operated knife adjacent the discharge end of said trough having a cutting portion extending into said trough at least to a point adjacent the vertex of the V.

References Cited in the file of this patent

UNITED STATES PATENTS

| | | |
|---|---|---|
| 1,329,755 | Dunkley | Feb. 3, 1920 |
| 2,100,455 | Souther et al. | Nov. 30, 1937 |
| 2,146,456 | Thompson | Feb. 7, 1939 |
| 2,259,332 | Winkelman | Oct. 14, 1941 |
| 2,372,325 | Hein | Mar. 27, 1945 |
| 2,556,266 | Furtado | June 12, 1951 |
| 2,698,037 | Shaw | Dec. 28, 1954 |
| 2,735,466 | Krstinich | Feb. 21, 1956 |
| 2,745,453 | Perrelli et al. | May 15, 1956 |